United States Patent
Kuriyama et al.

(10) Patent No.: US 12,199,710 B2
(45) Date of Patent: Jan. 14, 2025

(54) WIRELESS COMMUNICATION METHOD AND WIRELESS COMMUNICATION SYSTEM

(71) Applicant: NIPPON TELEGRAPH AND TELEPHONE CORPORATION, Tokyo (JP)

(72) Inventors: Keita Kuriyama, Musashino (JP); Hayato Fukuzono, Musashino (JP); Masafumi Yoshioka, Musashino (JP); Takafumi Hayashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/909,206

(22) PCT Filed: Mar. 19, 2020

(86) PCT No.: PCT/JP2020/012417
§ 371 (c)(1),
(2) Date: Sep. 2, 2022

(87) PCT Pub. No.: WO2021/186699
PCT Pub. Date: Sep. 23, 2021

(65) Prior Publication Data
US 2023/0106272 A1    Apr. 6, 2023

(51) Int. Cl.
*H04B 7/06* (2006.01)
*H04B 7/08* (2006.01)

(52) U.S. Cl.
CPC ......... *H04B 7/0617* (2013.01); *H04B 7/086* (2013.01)

(58) Field of Classification Search
CPC .............................. H04B 7/0617; H04B 7/086
(Continued)

(56) References Cited

U.S. PATENT DOCUMENTS

2006/0193298 A1    8/2006  Kishigami et al.
2009/0207765 A1*   8/2009  Yamaura ............. H04B 7/0417
                                                              370/310
(Continued)

FOREIGN PATENT DOCUMENTS

JP     2005065242 A     3/2005
JP     2012209742 A    10/2012

OTHER PUBLICATIONS

Keita Kuriyama et al., "Wide-band Single-Carrier MIMO System Using FIR-type Transmit Beamforming and Bi-Directional Receive Equalization", 2019 IEICE, B-5-105, p. 371, (Mar. 19, 2019).

*Primary Examiner* — Leila Malek (57) ABSTRACT

A wireless communication method in a wireless communication system which includes a radio transmitting station apparatus having a plurality of antennas and a radio receiving station apparatus having an antenna and which performs transmission and reception of a radio signal with a single carrier. The wireless communication method includes: estimating a communication path matrix based on a training signal; transforming the estimated communication path matrix into a frequency domain, transforming a complex conjugate transposed matrix of each of a unitary matrix and an adjoint matrix obtained by performing singular value decomposition for each frequency with respect to the transformed frequency domain communication path matrix into a time domain, and adopting each as a reception weight matrix and a transmission weight matrix; performing transmission beam formation based on the transmission weight matrix; and performing reception beam formation based on the reception weight matrix.

4 Claims, 3 Drawing Sheets

(58) Field of Classification Search
USPC .......................................................... 375/267
See application file for complete search history.

(56) References Cited

U.S. PATENT DOCUMENTS

2014/0011493 A1    1/2014  Toh et al.
2014/0036655 A1*  2/2014  Zhang .................. H04B 7/0417
                                                          370/329
2019/0319677 A1*  10/2019  Hansen .................... H04B 7/04

\* cited by examiner

Fig. 3

WIRELESS COMMUNICATION METHOD AND WIRELESS COMMUNICATION SYSTEM

CROSS-REFERENCE TO RELATED APPLICATIONS

This application is a 371 U.S. National Phase of International Application No. PCT/JP2020/012417, filed on Mar. 19, 2020. The entire disclosure of the above application is incorporated herein by reference.

TECHNICAL FIELD

The present invention relates to a wireless communication method and a wireless communication system.

BACKGROUND ART

When performing wide-band SC-MIMO (Single Carrier-Multiple Input Multiple Output) transmission in a frequency-selective fading environment, inter-symbol interference due to transmission delay in a time direction and inter-stream interference in a spatial direction must be suppressed and signals overlapping with each other in a time domain and a space domain must be separated for each stream.

Figure 3:
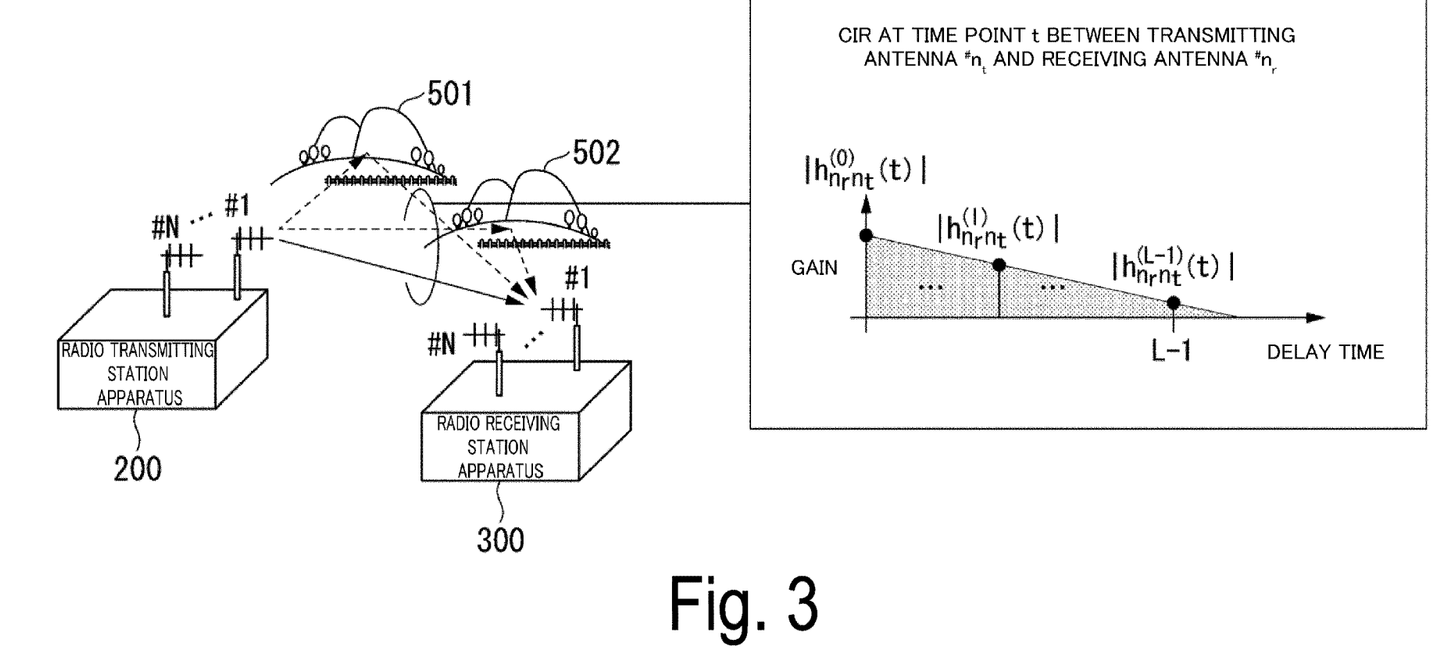
FIG. 3 is a diagram for illustrating formation of a FIR filter-type transmission beam when the numbers of antennas of a radio transmitting station apparatus and a radio receiving station apparatus are the same.

For example, as shown in a left-side diagram in FIG. 3, let us assume that radio communication is to be performed between a radio transmitting station apparatus 200 and a radio receiving station apparatus 300, each of which having N-number of antennas. The radio receiving station apparatus 300 receives direct waves from the radio transmitting station apparatus 200 and reflected waves from obstacles 501 and 502 and the like.

Let $n_t$ represent an arbitrary transmitting antenna that is any one transmitting antenna among the N-number of transmitting antennas of the radio transmitting station apparatus 200 and $n_r$ represent an arbitrary receiving antenna that is any one receiving antenna among the N-number of receiving antennas of the radio receiving station apparatus 300. If a CIR (Channel Impulse Response) length is denoted by "L", then a CIR between the transmitting antenna $n_t$ and the receiving antenna $n_r$ is represented by a sum of gains between the transmitting antenna $n_t$ and the receiving antenna $n_r$ for each time point taking into consideration a delay time as shown in a right-side diagram in FIG. 3.

For example, the technique disclosed in NPL 1 adopts an approach of approximating a transfer function of a CIR between a transmitting antenna and a receiving antenna in a time direction with a transfer function of an FIR (Finite Impulse Response) indicated by expression (1) below.

[Math. 1]

$$h_{n_r n_t}(z) = \sum_{l=0}^{L-1} h_{n_r n_t}^{(l)} z^{-l} \quad (1)$$

In expression (1), $z^{-1}$ is a variable z of the Z-transform and represents a delay operator for performing a time shift. In a spatial direction, the transfer function can be represented by a CIR matrix of which an element is a CIR in the time direction for each combination of a transmitting antenna and a receiving antenna. As shown in expression (2) below, this CIR matrix is a communication path matrix h(z) of an N×N MIMO.

[Math. 2]

$$h(z) = \begin{bmatrix} h_{11}(z) & \dots & h_{1N}(z) \\ \vdots & \ddots & \vdots \\ h_{N1}(z) & \dots & h_{NN}(z) \end{bmatrix} \quad (2)$$

For example, in the technique disclosed in NPL 1, signals that overlap with each other in a time domain and a space domain are separated for each stream as described below. As represented by expression (3) below, since the numbers of transmitting antennas and receiving antennas are both N, the communication path matrix h(z) belongs to a group of N×N matrices and is regular.

[Math. 3]

$$h(z) \in \mathbb{C}^{N \times N} \quad (3)$$

In this case, an inverse matrix $h(z)^{-1}$ of the communication path matrix h(z) can be expressed using an inverse response of a determinant (det $[h(z)]^{-1}$) and an adjugate matrix (adj [h(z)]) as shown in expression (4) below. In this case, det [•] denotes an operator of a determinant and adj [•] denotes an operator of an adjugate matrix.

[Math. 4]

$$h(z)^{-1} = \frac{1}{\det[h(z)]} adj[h(z)] \quad (4)$$

As shown in expression (5), the adjugate matrix (adj [h(z)]) in expression (4) also belongs to a group of N×N matrices and is regular.

[Math. 5]

$$adj(h(z)) \in \mathbb{C}^{N \times N} \quad (5)$$

When a transmission beam is formed using the adjugate matrix (adj [h(z)]) as a transmission weight, an equivalent expression of a communication path response is as represented by expression (6) below.

[Math. 6]

$$h(z)adj[h(z)] = \begin{bmatrix} \det[h(z)] & & 0 \\ & \ddots & \\ 0 & & \det[h(z)] \end{bmatrix} \quad (6)$$

As shown in expression (6), since the equivalent expression of a communication path response has been diagonalized, inter-stream interference is suppressed. In this case, since det [h(z)] remains as inter-symbol interference, by multiplying a reception signal of each receiving antenna with det $[h(z)]^{-1}$ as a reception weight on a receiving side, the equivalent expression of a communication path response can be made into an identity matrix. Accordingly, since inter-symbol interference is suppressed, signals that overlap with each other in the time domain and the space domain can be separated for each stream.

CITATION LIST

Non Patent Literature

[NPL 1] Keita Kuriyama, Hayato Fukuzono, Masafumi Yoshioka, Tsutomu Tat suta, "*FIR gata sousin bimu keisei* to souhoukou zyusintouka wo tekiyousita koutaiiki singu-rukyaria MIMO sisutemu (Wide-band Single Carrier MIMO Using FIR-type Transmit Beamforming and Bi-directional Reception Equalization)", Proceedings of the IEICE General Conference 1, March 19-22, 2019, B-5-105, p. 371

SUMMARY OF THE INVENTION

Technical Problem

However, the technique disclosed in NPL 1 has a problem in that, since an adjugate matrix is used and an adjugate matrix is a matrix that can only be generated when an original matrix is a square matrix, the technique disclosed in NPL 1 cannot be applied when the numbers of transmitting antennas and receiving antennas differ from each other or, in other words, in a case of a non-square MIMO communication path matrix.

In consideration of the circumstances described above, an object of the present invention is to provide a technique that enables FIR filter-type transmission beam formation and reception beam formation even when the numbers of antennas on a transmission side and a reception side differ from each other.

Means for Solving the Problem

An aspect of the present invention is a wireless communication method in a wireless communication system which includes a radio transmitting station apparatus having a plurality of antennas and a radio receiving station apparatus having an antenna and which performs transmission and reception of a radio signal with a single carrier, the wireless communication method including: the radio receiving station apparatus or the radio transmitting station apparatus estimating a communication path matrix based on a training signal; the radio receiving station apparatus or the radio transmitting station apparatus transforming the estimated communication path matrix into a frequency domain, transforming a complex conjugate transposed matrix of each of a unitary matrix and an adjoint matrix obtained by performing singular value decomposition for each frequency with respect to the transformed frequency domain communication path matrix into a time domain, and adopting each as a reception weight matrix and a transmission weight matrix; the radio transmitting station apparatus performing transmission beam formation based on the transmission weight matrix; and the radio receiving station apparatus performing reception beam formation based on the reception weight matrix.

An aspect of the present invention is a wireless communication system which includes a radio transmitting station apparatus having a plurality of antennas and a radio receiving station apparatus having an antenna and which performs transmission and reception of a radio signal with a single carrier, wherein: the radio receiving station apparatus or the radio transmitting station apparatus includes a communication path estimating unit configured to estimate a communication path matrix based on a training signal; the radio receiving station apparatus or the radio transmitting station apparatus includes a transmission/reception weight calculating unit configured to transform the communication path matrix estimated by the communication path estimating unit into a frequency domain, which transforms a complex conjugate transposed matrix of each of a unitary matrix and an adjoint matrix obtained by performing singular value decomposition for each frequency with respect to the transformed frequency domain communication path matrix into a time domain, and which adopts each as a reception weight matrix and a transmission weight matrix; the radio receiving station apparatus includes a reception beam formation processing unit configured to perform reception beam formation based on the reception weight matrix; and the radio transmitting station apparatus includes a transmission beam formation processing unit configured to perform transmission beam formation based on the transmission weight matrix received from the radio receiving station apparatus.

Effects of the Invention

According to the present invention, FIR filter-type transmission beam formation and reception beam formation can be performed even when the numbers of antennas on a transmission side and a reception side differ from each other.

DESCRIPTION OF EMBODIMENTS

Figure 1:
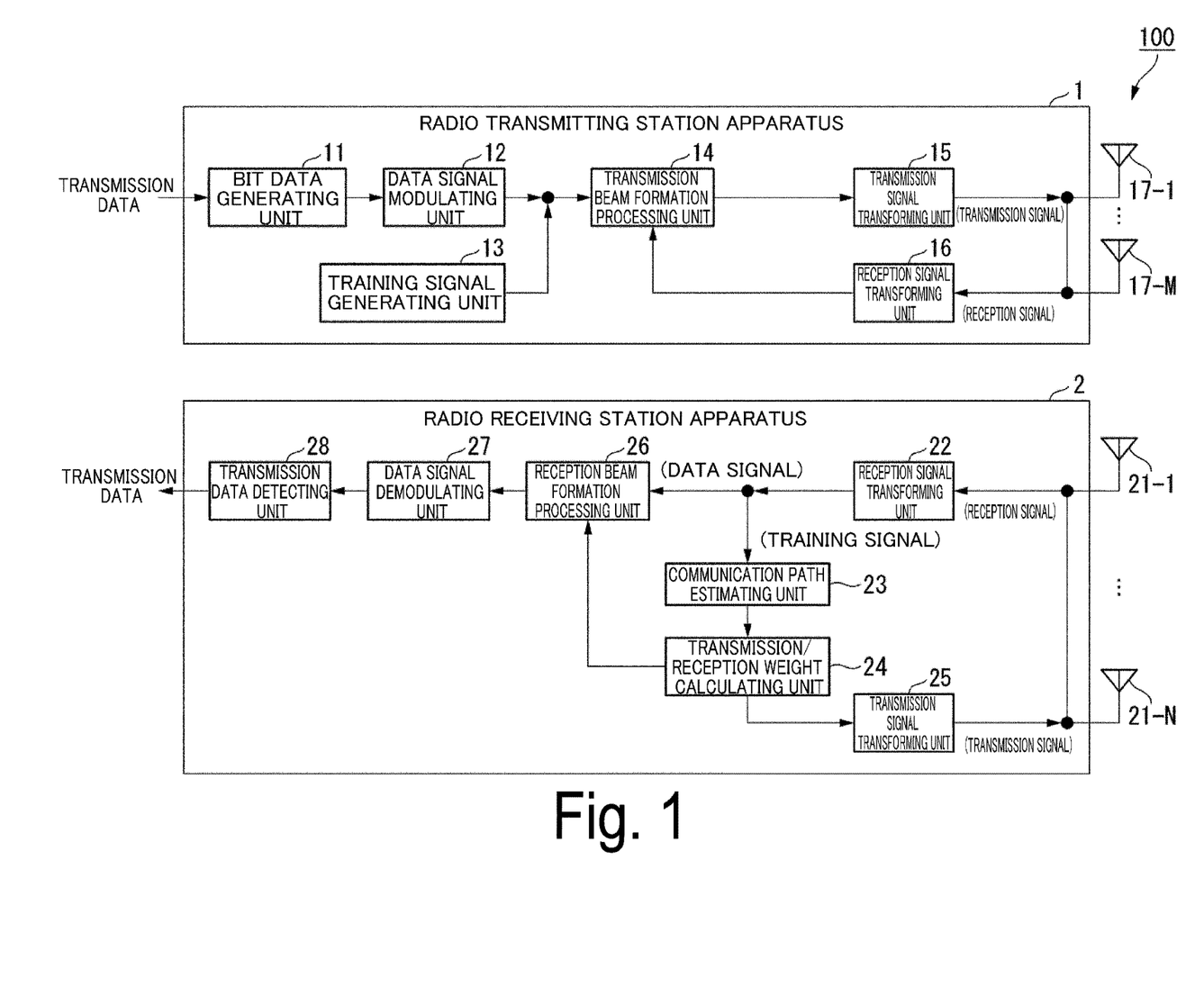
FIG. 1 is a block diagram showing a configuration of a wireless communication system according to the present embodiment.

Hereinafter, an embodiment of the present invention will be described with reference to the drawings. FIG. 1 is a block diagram showing a configuration of a wireless communication system 100 according to the present embodiment. The wireless communication system 100 includes a radio transmitting station apparatus 1 and a radio receiving station apparatus 2.

The radio transmitting station apparatus 1 includes a bit data generating unit 11, a data signal modulating unit 12, a training signal generating unit 13, a transmission beam formation processing unit 14, (transmission beam formation processor), a transmission signal transforming unit 15, a reception signal transforming unit 16, and M-number of antennas 17-1 to 17-M, where M is an integer that is equal to or larger than 2.

The bit data generating unit 11 generates bit data of transmission data to be transmitted to the radio receiving station apparatus 2. The bit data generating unit 11 may perform error correction encoding and interleaving when generating the bit data. The data signal modulating unit 12 transforms the bit data generated by the bit data generating unit 11 into a data signal according to a modulation system. As the modulation system, for example, quadrature amplitude modulation (QAM) is applied.

The training signal generating unit 13 generates a training signal determined in advance which is also known to the radio receiving station apparatus 2. The transmission beam formation processing unit 14 performs processing for forming a transmission beam based on a transmission weight matrix calculated by a transmission/reception weight calculating unit 24 of the radio receiving station apparatus 2. The transmission beam formation processing unit 14 may perform normalization of transmission power when forming the transmission beam.

The transmission signal transforming unit 15 performs processing for transforming a transmission beam formed by the transmission beam formation processing unit 14 into an analog transmission signal to be sent by radio waves from each of the antennas 17-1 to 17-M. The antennas 17-1 to 17-M perform transmission and reception of radio waves to and from the radio receiving station apparatus 2. The reception signal transforming unit 16 transforms an analog reception signal corresponding to a radio wave received by the antennas 17-1 to 17-M into a digital signal. The reception signal transforming unit 16 outputs a transmission weight matrix included in the transformed digital signal to the transmission beam formation processing unit 14.

The radio receiving station apparatus 2 includes a reception signal transforming unit 22, a communication path estimating unit 23 (communication path estimator), the transmission/reception weight calculating unit 24 (transmission/reception weight calculator), a transmission signal transforming unit 25, a reception beam formation processing unit 26 (reception beam formation processor), a data signal demodulating unit 27, a transmission data detecting unit 28, and N-number of antennas 21-1 to 21-N, where N is an integer that is equal to or larger than 2. N may be either a same value as M or a value that differs from M.

The antennas 21-1 to 21-N perform transmission and reception of radio waves to and from the radio transmitting station apparatus 1. The reception signal transforming unit 22 transforms an analog reception signal corresponding to a radio wave received by the antennas 21-1 to 21-N into a digital signal.

When a training signal is included in the transformed digital signal, the reception signal transforming unit 22 reads the training signal from the digital signal. The reception signal transforming unit 22 outputs the read training signal to the communication path estimating unit 23. In addition, when a data signal prior to reception beam formation is included in the transformed digital signal, the reception signal transforming unit 22 reads the data signal prior to reception beam formation from the digital signal. The reception signal transforming unit 22 outputs the read data signal prior to reception beam formation to the reception beam formation processing unit 26.

The communication path estimating unit 23 estimates a communication path matrix h(z) based on the training signal output by the reception signal transforming unit 22. The transmission/reception weight calculating unit 24 calculates a transmission weight matrix and a reception weight matrix based on the communication path matrix h(z) estimated by the communication path estimating unit 23. The transmission/reception weight calculating unit 24 outputs the calculated transmission weight matrix to the transmission signal transforming unit 25. The transmission/reception weight calculating unit 24 outputs the calculated reception weight matrix to the reception beam formation processing unit 26.

The transmission signal transforming unit 25 performs processing for transforming the transmission weight matrix into an analog transmission signal to be sent by radio waves from each of the antennas 17-1 to 17-M.

The reception beam formation processing unit 26 forms a reception beam based on the reception weight matrix output by the transmission/reception weight calculating unit 24 and N-number of data signals prior to reception beam formation corresponding to the antennas 21-1 to 21-N and restores the data signals.

The data signal demodulating unit 27 demodulates a data signal using a demodulation system corresponding to the modulation system used for modulation by the data signal modulating unit 12 of the radio transmitting station apparatus 1 and restores bit data. The transmission data detecting unit 28 detects transmission data from the bit data demodulated by the data signal demodulating unit 27. When the bit data generating unit 11 has performed error correction encoding, the transmission data detecting unit 28 performs error correction decoding, and when the bit data generating unit 11 has performed interleaving, the transmission data detecting unit 28 performs de-interleaving.

(Processing by Wireless Communication System)

Figure 2:
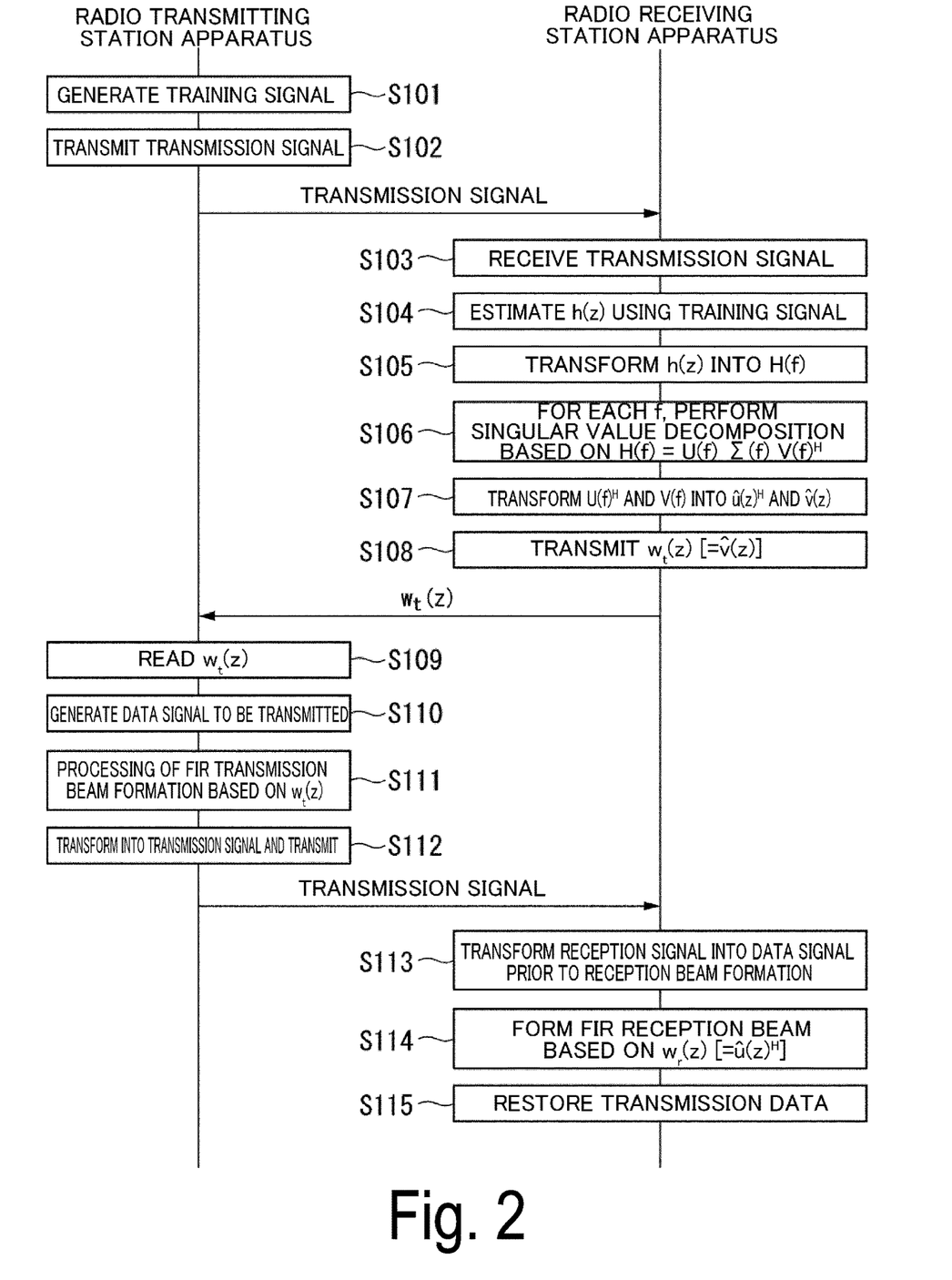
FIG. 2 is a sequence diagram showing a flow of processing by the wireless communication system according to the present embodiment.

FIG. 2 is a sequence diagram showing a flow of processing by the wireless communication system 100 according to the present embodiment.

The training signal generating unit 13 of the radio transmitting station apparatus 1 generates a training signal (step S101). The training signal generating unit 13 outputs the generated training signal to the transmission beam formation processing unit 14.

The transmission beam formation processing unit 14 forms a transmission beam based on the training signal output by the training signal generating unit 13. The transmission signal transforming unit 15 performs processing for transforming the transmission beam formed by the transmission beam formation processing unit 14 into an analog transmission signal to be sent from each of the antennas 17-1 to 17-M. Subsequently, the transmission signal transforming unit 15 transmits the analog transmission signal by radio waves to the radio receiving station apparatus 2 via the antennas 17-1 to 17-M (step S102). At a time point of step S102, the transmission beam formation processing unit 14 has not been provided with a transmission weight matrix. Therefore, the transmission beam formation processing unit 14 forms a transmission beam without using a transmission weight matrix. As a result, an unweighted transmission signal is to be transmitted from each of the antennas 17-1 to 17-M.

Each of the antennas 21-1 to 21-N of the radio receiving station apparatus 2 receives the transmission signal transmitted by each of the antennas 17-1 to 17-M of the radio transmitting station apparatus 1 (step S103). The reception signal transforming unit 22 transforms an analog reception signal corresponding to the transmission signal received by each of the antennas 21-1 to 21-N into a digital signal. The reception signal transforming unit 22 reads the training signal included in each of the plurality of transformed digital signals. The reception signal transforming unit 22 outputs the plurality of read training signals to the communication path estimating unit 23.

The communication path estimating unit 23 estimates a communication path matrix h(z) based on the plurality of read training signals (step S104). Specifically, the communication path estimating unit 23 calculates the communication path matrix h(z) being an N×M matrix indicated by expression (7) below having, as an element of the matrix, expression (1) above which approximates a transfer function of CIR using a transfer function of FIR. In applying expression (1), a CIR length is denoted by "L", any one arbitrary antenna among the antennas 17-1 to 17-M of the radio transmitting station apparatus 1 is denoted by $n_t$, and any one arbitrary receiving antenna among the antennas 21-1 to 21-N of the radio receiving station apparatus 2 is denoted by $n_r$. The communication path estimating unit 23 outputs the estimated communication path matrix h(z) to the transmission/reception weight calculating unit 24.

[Math. 7]

$$h(z) = \begin{bmatrix} h_{11}(z) & \cdots & h_{1M}(z) \\ \vdots & \ddots & \vdots \\ h_{N1}(z) & \cdots & h_{NM}(z) \end{bmatrix} \quad (7)$$

The transmission/reception weight calculating unit 24 inputs the communication path matrix h(z) output by the communication path estimating unit 23. The transmission/reception weight calculating unit 24 calculates a transmission weight matrix and a reception weight matrix according to singular value decomposition in a frequency domain with respect to the input communication path matrix h(z). The transmission/reception weight calculating unit 24 first calculates a communication path matrix H(f) of the frequency domain by performing a discrete Fourier transform (DFT) on the communication path matrix h(z) as shown in expression (8) below (step S105).

[Math. 8]

$$h(z) \in \mathbb{C}^{N \times M} \xrightarrow{DFT} H(f) \in \mathbb{C}^{N \times M} \quad (8)$$

As shown in expression (8), the communication path matrix H(f) of the frequency domain belongs to a group of N×M matrices in a similar manner to the communication path matrix h(z) of the time domain and is therefore an N×M matrix.

By performing singular value decomposition as shown in expression (9) below with respect to the communication path matrix H(f) of the frequency domain, the transmission/reception weight calculating unit 24 calculates an N-row, N-column unitary matrix U(f) and an adjoint matrix (step S106). The adjoint matrix is an M-row, M-column complex conjugate transposed matrix V(f)$^H$ of the unitary matrix.

[Math. 9]

$$H(f) = U(f)\Sigma(f)V(f)^H \quad (9)$$

In expression (9), Σ(f) denotes an N-row, M-column diagonal matrix of which a diagonal element is a singular value.

By performing an inverse discrete Fourier transform (IDFT) with respect to U(f)$^H$ that is a complex transposed matrix of the N-row, N-column unitary matrix U(f) as shown in expression (10) below, the transmission/reception weight calculating unit 24 calculates a matrix in the time domain. Let the matrix calculated by the transmission/reception weight calculating unit 24 based on expression (10) below be a reception weight matrix $w_r(z)$.

[Math. 10]

$$U(f)^H \xrightarrow{IDFT} \hat{u}(z)^H = w_r(z) \quad (10)$$

In addition, by performing an inverse discrete Fourier transform (IDFT) with respect to V(f) that is a complex transposed matrix of the adjoint matrix V (f)$^H$ as shown in expression (11) below, the transmission/reception weight calculating unit 24 calculates a matrix in the time domain. Let the matrix calculated by the transmission/reception weight calculating unit 24 based on expression (11) below be a transmission weight matrix $w_t(z)$ (step S107).

[Math. 11]

$$V(f) \xrightarrow{IDFT} \hat{v}(z) = w_t(z) \quad (11)$$

The transmission/reception weight calculating unit 24 outputs the calculated transmission weight matrix $w_t(z)$ to the transmission signal transforming unit 25. The transmission/reception weight calculating unit 24 outputs the reception weight matrix $w_r(z)$ to the reception beam formation processing unit 26. The reception beam formation processing unit 26 inputs the reception weight matrix $w_r(z)$ output by the transmission/reception weight calculating unit 24.

The transmission signal transforming unit 25 inputs the transmission weight matrix $w_t(z)$ output by the transmission/reception weight calculating unit 24. The transmission signal transforming unit 25 transforms the input transmission weight matrix $w_t(z)$ into an analog transmission signal. The transmission signal transforming unit 25 transmits a radio wave corresponding to the transformed analog transmission signal to the radio transmitting station apparatus 1 via the antennas 21-1 to 21-N(step S108).

The reception signal transforming unit 16 of the radio transmitting station apparatus 1 transforms an analog reception signal corresponding to the radio wave received via the antennas 17-1 to 17-M into a digital signal. The reception signal transforming unit 16 reads the transmission weight matrix $w_t(z)$ included in the transformed digital signal (step S109). The reception signal transforming unit 16 outputs the read transmission weight matrix $w_t(z)$ to the transmission beam formation processing unit 14. The transmission beam formation processing unit 14 inputs the transmission weight matrix $w_t$ (z) output by the reception signal transforming unit 16.

Subsequently, processing for transmitting transmission data is started. The bit data generating unit 11 generates bit data of transmission data to be provided from the outside. The data signal modulating unit 12 transforms the bit data generated by the bit data generating unit 11 into a data signal according to a modulation system determined in advance (step S110). The data signal modulating unit 12 outputs the transformed data signal to the transmission beam formation processing unit 14.

The transmission beam formation processing unit 14 inputs the data signal output by the data signal modulating unit 12. The transmission beam formation processing unit 14 forms an FIR filter-type transmission beam based on the input data signal and the transmission weight matrix $w_t(z)$ (step S111).

The transmission signal transforming unit 15 performs processing for transforming the transmission beam formed by the transmission beam formation processing unit 14 into an analog transmission signal to be sent from each of the antennas 17-1 to 17-M. The transmission signal transforming unit 15 transmits a radio wave corresponding to the analog transmission signal to the radio receiving station apparatus 2 via the antennas 17-1 to 17-M (step S112).

The reception signal transforming unit 22 of the radio receiving station apparatus 2 transforms an analog reception signal corresponding to the radio wave received via the antennas 21-1 to 21-N into a digital signal (step S113). The reception signal transforming unit 22 reads a data signal prior to reception beam formation from the transformed digital signal. The reception signal transforming unit 22 outputs the read data signal prior to reception beam formation to the reception beam formation processing unit 26.

The reception beam formation processing unit 26 inputs the data signal prior to reception beam formation output by the reception signal transforming unit 22. The reception beam formation processing unit 26 restores the data signal by forming an FIR filter-type reception beam based on the input data signal prior to reception beam formation and the reception weight matrix $w_r(z)$ (step S114).

The data signal prior to reception beam formation input by the reception beam formation processing unit 26 or, in other words, a communication path response is to be represented by $h(z)w_t(z)$ obtained by multiplying the communication path matrix $h(z)$ by the transmission weight matrix $w_t(z)$. A multiplication of the reception weight matrix $w_r(z)$ and the data signal prior to reception beam formation is to be represented as expression (12) below.

[Math. 12]

$$w_r(z)h(z)w_t(z) = \hat{u}(z)^H u(z) \sum (z) v(z)^H \hat{v}(z)$$
$$= \sum (z) = \begin{cases} [\Delta \; 0] & (N < M) \\ \Delta & (N = M) \\ \begin{bmatrix} \Delta \\ 0 \end{bmatrix} & (N > M) \end{cases} \quad (12)$$

In expression (12), $\Delta$ denotes a matrix shown in expression (13) which is a diagonal matrix having transfer functions $\lambda_1(z)$ to $\lambda_q(z)$ of a singular value as elements.

[Math. 13]

$$\Delta = \mathrm{diag}(\Delta_1(z), \ldots, \Delta_q(z)) \quad (13)$$

In expression (13), q=rank [matrix h(z)] and q≤(N,M). Therefore, with respect to a result of multiplication of the reception weight matrix $w_r(z)$ and the data signal prior to reception beam formation, the reception beam formation processing unit 26 multiplies each of $\lambda_1(z)^{-1}$ to $\lambda_q(z)^{-1}$ for each row or, in other words, for each stream. Accordingly, inter-symbol interference can be suppressed and signals can be separated for each stream. $\Delta$ may be made an identity matrix by having the transmission beam formation processing unit 14 process $\lambda_1(z)^{-1}$ to $\lambda_q(z)^{-1}$ of each stream when forming the transmission beam.

The reception beam formation processing unit 26 outputs the restored data signal to the data signal demodulating unit 27.

The data signal demodulating unit 27 inputs the data signal output by the reception beam formation processing unit 26. The data signal demodulating unit 27 demodulates the input data signal and restores bit data (step S115). The transmission data detecting unit 28 detects transmission data from the bit data demodulated by the data signal demodulating unit 27. The transmission data detecting unit 28 outputs the detected transmission data to the outside.

The wireless communication system 100 according to the embodiment described above includes the radio transmitting station apparatus 1 having the plurality of antennas 17-1 to 17-M and the radio receiving station apparatus 2 having the plurality of antennas 21-1 to 21-M. In the radio receiving station apparatus 2, the communication path estimating unit 23 estimates a communication path matrix $h(z)$ based on a training signal received from the radio transmitting station apparatus 1. The transmission/reception weight calculating unit 24 transforms the communication path matrix $h(z)$ estimated by the communication path estimating unit 23 into a frequency domain, transforms, into a time domain, a complex conjugate transposed matrix of each of a unitary matrix $U(f)$ and an adjoint matrix $V(f)^H$ obtained by performing singular value decomposition for each frequency with respect to the transformed communication path matrix of the frequency domain, and adopts each as a reception weight matrix $w_r(z)$ and a transmission weight matrix $w_t(z)$. The reception beam formation processing unit 26 performs reception beam formation based on the reception weight matrix $w_r(z)$. In the radio transmitting station apparatus 1, the transmission beam formation processing unit 14 performs transmission beam formation based on the transmission weight matrix $w_t(z)$ received from the radio receiving station apparatus 2. Accordingly, the wireless communication system 100 according to the embodiment described above is capable of performing FIR filter-type transmission beam formation and reception beam formation even when the numbers of antennas on a transmission side and a reception side differ from each other or, in other words, even when the communication path matrix $h(z)$ is non-square.

In addition, in the wireless communication system 100 described above, as shown at the end of expression (12), regardless of the number "M" of the antennas 17-1 to 17-M of the radio transmitting station apparatus 1 and the number "N" of the antennas 21-1 to 21-N of the radio receiving station apparatus 2 being the same or different, a gain of each stream is to be dependent on transfer functions $\lambda_1(z)$ to $\lambda_q(Z)$ of each singular value. Therefore, when correlation of the communication path matrix $h(z)$ is high, several singular values are to be 0 or, in other words, q<min (M,N). In this case, since a part of the singular values is 0, although there is a possibility that some of the streams become low throughput or non-communicable, communication will not be disabled in all streams.

In addition, in the wireless communication system 100 described above, the transmission weight matrix $w_t(z)$ and the reception weight matrix $w_r(z)$ are calculated in the frequency domain and processing for multiplying the transmission weight matrix $w_t(z)$ and the reception weight matrix $w_r(z)$ or, in other words, processing for forming a transmission beam and a reception beam is performed in the time domain. Therefore, since processing of formation of a transmission beam and a reception beam in the time domain can be sequentially performed with respect to a data signal, processing delay can be reduced as compared to adopting a method of performing a discrete Fourier transform with respect to a data signal.

In the processing by the transmission/reception weight calculating unit 24 in the embodiment described above, a fast Fourier transform can be applied in place of a discrete Fourier transform and an inverse fast Fourier transform can be applied in place of an inverse discrete Fourier transform.

In addition, while the radio receiving station apparatus 2 includes the transmission/reception weight calculating unit 24 in the embodiment described above, alternatively, the radio transmitting station apparatus 1 may include the transmission/reception weight calculating unit 24 and calculate the reception weight matrix $w_r(z)$ and the transmission weight matrix $w_t(z)$. In this case, the transmission signal transforming unit 15 of the radio transmitting station apparatus 1 is to receive the reception weight matrix $w_r(z)$ from the transmission/reception weight calculating unit 24 and transmit the reception weight matrix $w_r(z)$ to the radio receiving station apparatus 2.

Furthermore, while the radio transmitting station apparatus 1 includes the training signal generating unit 13 and the radio receiving station apparatus 2 includes the communication path estimating unit 23 in the embodiment described above, alternatively, the radio receiving station apparatus 2 may include the training signal generating unit 13, the radio transmitting station apparatus 1 may include the communication path estimating unit 23, and the radio transmitting station apparatus 1 may estimate the communication path matrix h(z). In this case, when the radio receiving station apparatus 2 includes the transmission/reception weight calculating unit 24, the transmission signal transforming unit 15 of the radio transmitting station apparatus 1 is to receive the communication path matrix h(z) from the communication path estimating unit 23 and transmit the communication path matrix h (z) to the radio receiving station apparatus 2.

In addition, while the radio receiving station apparatus 2 includes the plurality of antennas 21-1 to 21-N in the embodiment described above, alternatively, there may be a plurality of radio receiving station apparatuses 2 including a single antenna 21-1 or a plurality of radio receiving station apparatuses 2 including the plurality of antennas 21-1 to 21-N.

The radio transmitting station apparatus 1 and the radio receiving station apparatus 2 in the embodiment described above may be realized by a computer. In this case, a program for realizing the functions may be recorded in a computer-readable recording medium and the program recorded in the recording medium may be realized by having a computer system load and execute the program. It is assumed that a "computer system" as used herein includes an OS and hardware such as peripheral devices. In addition, a "computer-readable recording medium" refers to a portable medium such as a flexible disk, a magneto-optical disk, a ROM, or a CD-ROM or a storage apparatus such as a hard disk that is built into the computer system. Furthermore, a "computer-readable recording medium" may also include a recording medium that dynamically holds a program for a short period of time such as a communication wire when the program is to be transmitted via a network such as the Internet or a communication line such as a telephone line as well as a recording medium that holds a program for a certain period of time such as a volatile memory inside a server or a computer system to become a client. Moreover, the program described above may be any of a program for realizing a part of the functions described above, a program capable of realizing the functions described above in combination with a program already recorded in a computer system, and a program for realizing the functions using a programmable logic device such as an FPGA (Field Programmable Gate Array).

While an embodiment of the present invention has been described in detail with reference to the drawings, it is to be understood that specific configurations are not limited to the embodiment and that the present invention also includes designs and the like which do not constitute departures from the gist of the present invention.

INDUSTRIAL APPLICABILITY

The present invention is applicable to radio communication in which SC-MIMO transmission is to be performed.

REFERENCE SIGNS LIST

1 Radio transmitting station apparatus
2 Radio receiving station apparatus
11 Bit data generating unit
12 Data signal modulating unit
13 Training signal generating unit
14 Transmission beam formation processing unit
15 Transmission signal transforming unit
16 Reception signal transforming unit
17-1 to 17-M Antenna
21-1 to 21-N Antenna
22 Reception signal transforming unit
23 Communication path estimating unit
24 Transmission/reception weight calculating unit
25 Transmission signal transforming unit
26 Reception beam formation processing unit
27 Data signal demodulating unit
28 Transmission data detecting unit

The invention claimed is:

1. A wireless communication method in a wireless communication system which includes a radio transmitting station apparatus having a plurality of antennas and a radio receiving station apparatus having an antenna and which performs transmission and reception of a radio signal with a single carrier, the wireless communication method comprising:

the radio receiving station apparatus or the radio transmitting station apparatus estimating a communication path matrix based on a training signal, the communication path matrix is represented by a transfer function matrix where the elements of the communication path matrix are transfer function; wherein the communication path matrix being an N×M matrix indicated by expression (2) below having, as an element of the matrix, expression (1) which approximates a transfer function of Channel Impulse Response (CIR) using a transfer function of Finite Impulse Response;

the radio receiving station apparatus or the radio transmitting station apparatus transforming the estimated communication path matrix into a frequency domain, transforming a complex conjugate transposed matrix of each of a unitary matrix and an adjoint matrix obtained by performing singular value decomposition for each frequency with respect to the transformed frequency domain communication path matrix into a time domain, and adopting each as a reception weight matrix and a transmission weight matrix, where the reception weight matrix and the transmission weight matrix are represented by a transfer function matrix and where the elements of the reception weight matrix and the transmission weight matrix are transfer function;

the radio transmitting station apparatus performing transmission beam formation based on the transmission weight matrix; and the radio receiving station apparatus performing reception beam formation based on the reception weight matrix $$h_{n_r n_t}(z) = \sum_{l=0}^{L-1} h_{n_r n_t}^{(l)} z^{-l} \quad (1)$$

$$h(z) = \begin{bmatrix} h_{11}(z) & \cdots & h_{1M}(z) \\ \vdots & \ddots & \vdots \\ h_{N1}(z) & \cdots & h_{NM}(z) \end{bmatrix} \quad (2)$$

where L represents the CIR length, $n_t$ represents any antenna that the radio transmitting station appratus has, and $n_r$ represents any antenna that the radio receiving station apparatus has, $z^{-1}$ is a variable z of the Z-transform and represents a delay operator for performing a time shift, N and M are non-zero positive integers.

2. The wireless communication method according to claim 1, wherein
the radio receiving station apparatus is either a single radio receiving station apparatus having a plurality of antennas or a plurality of radio receiving station apparatuses each having a single antenna or a plurality of antennas.

3. The wireless communication method according to claim 1, wherein
the number of antennas of the radio transmitting station apparatus and the number of antennas of the radio receiving station apparatus differ from each other.

4. A wireless communication system which comprises a radio transmitting station apparatus having a plurality of antennas and a radio receiving station apparatus having an antenna and which performs transmission and reception of a radio signal with a single carrier, wherein:
the radio receiving station apparatus or the radio transmitting station apparatus includes
a communication path estimator configured to estimate a communication path matrix based on a training signal, the communicatoin path matrix is represented by a transfer function matrix where the elements of the communication path matrix are transfer function; wherein the communication path matrix being an N×M matrix indicated by expression (2) below having, as an element of the matrix, expression (1) which approximates a transfer function of Channel Impulse Response (CIR) using a transfer function of Finite Impulse Response;
the radio receiving station apparatus or the radio transmitting station apparatus includes
a transmission/reception weight calculator configured to transform the communication path matrix estimated by the communication path estimator into a frequency domain, which transforms a complex conjugate transposed matrix of each of a unitary matrix and an adjoint matrix obtained by performing singular value decomposition for each frequency with respect to the transformed frequency domain communication path matrix into a time domain, and which adopts each as a reception weight matrix and a transmission weight matrix, where the reception weight matrix and the transmission weight matrix are represented by a transfer function matrix and where the elements of the reception weight matrix and the transmission weight matrix are transfer function;
the radio receiving station apparatus includes
a reception beam formation processor configured to perform reception beam formation based on the reception weight matrix; and
the radio transmitting station apparatus includes
a transmission beam formation processor configured to perform transmission beam formation based on the transmission weight matrix $$h_{n_r n_t}(z) = \sum_{l=0}^{L-1} h_{n_r n_t}^{(l)} z^{-l} \quad (1)$$

$$h(z) = \begin{bmatrix} h_{11}(z) & \cdots & h_{1M}(z) \\ \vdots & \ddots & \vdots \\ h_{N1}(z) & \cdots & h_{NM}(z) \end{bmatrix} \quad (2)$$

where L represents the CIR length, $n_t$ represents any antenna that the radio transmitting station apparatus has, and $n_r$ represents any antenna that the radio receiving station apparatus has, $z^{-1}$ is a variable z of the Z-transform and represents a delay operator for performing a time shift, N and M are non-zero positive integers.

* * * * *